United States Patent [19]
Von Arx

[11] Patent Number: 5,913,439
[45] Date of Patent: Jun. 22, 1999

[54] MOUNTING ASSEMBLY WITH DUAL MOUNT COLLAR

[75] Inventor: Theodore T. Von Arx, La Crescent, Minn.

[73] Assignee: Watlow Electric Manufacturing Co., St. Louis, Mo.

[21] Appl. No.: 08/921,005

[22] Filed: Aug. 29, 1997

[51] Int. Cl.$^6$ .................................................. H02G 3/04
[52] U.S. Cl. .......................... 220/3.7; 220/4.03; 174/48
[58] Field of Search .................................. 220/4.03, 3.7, 220/3.2, 3.3; 174/48

[56] References Cited

U.S. PATENT DOCUMENTS

| 754,414 | 3/1904 | Borsert | 220/3.7 |
|---|---|---|---|
| 2,124,021 | 7/1938 | Akers | 220/4.03 |
| 3,814,834 | 6/1974 | Glader | 220/4.03 |
| 4,685,035 | 8/1987 | Nanjoh . | |
| 4,716,496 | 12/1987 | Fritsch . | |
| 4,733,330 | 3/1988 | Tanaka et al. . | |
| 4,816,966 | 3/1989 | Frankowski . | |
| 4,952,754 | 8/1990 | Rye . | |
| 4,964,527 | 10/1990 | Martin | 220/4.03 |
| 5,594,205 | 1/1997 | Cancellieri et al. . | |
| 5,594,208 | 1/1997 | Cancellieri et al. . | |
| 5,605,242 | 2/1997 | Hwang | 220/4.03 |
| 5,614,695 | 3/1997 | Navazo . | |
| 5,627,340 | 5/1997 | Smith et al. . | |
| 5,715,962 | 2/1998 | McDonnell | 220/4.03 |

FOREIGN PATENT DOCUMENTS

| 1078715 | 4/1960 | Germany | 220/3.7 |
|---|---|---|---|

OTHER PUBLICATIONS

Drawing of Watlow Controls, Inc. part No. 0822–0395–000X; drawing date is Jul. 13, 1998.

*Primary Examiner*—Joseph M. Moy
*Attorney, Agent, or Firm*—Herzog, Crebs & McGhee, LLP

[57] ABSTRACT

An assembly for mounting a device in a control panel. The assembly includes a flanged housing and a collar. The collar has a forwardly and inwardly open recess which receives the flange of the housing to allow flush rear mounting of the assembly on a control panel and attachment means for such mounting. The collar also has a restraint mechanism, such as a ratchet, which allows forward movement of the collar on the housing for through mounting of the device on a control panel but prevents rearward movement of the collar on the housing to thereby squeeze the control panel firmly between the flange and the collar. The restraint preferably includes a set of transversally spaced ratchet arms of varying lengths to allow fine adjustment of the collar position on the housing for flush rear mounting and for firmer through mounting.

15 Claims, 2 Drawing Sheets

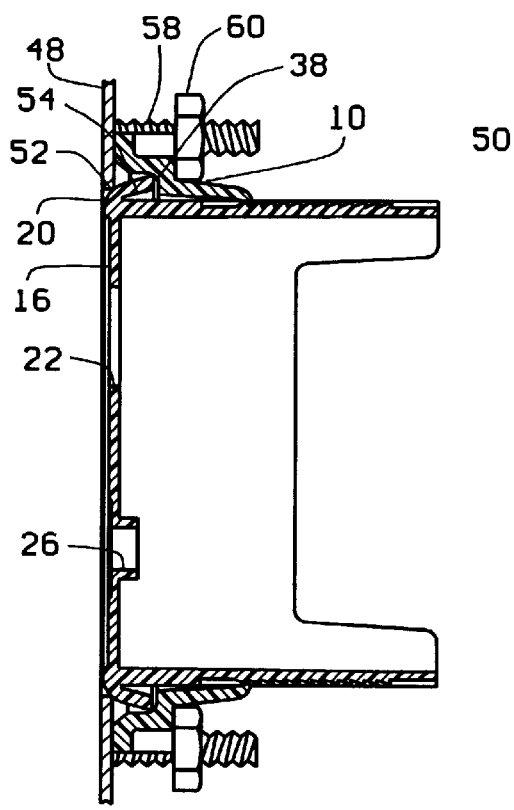
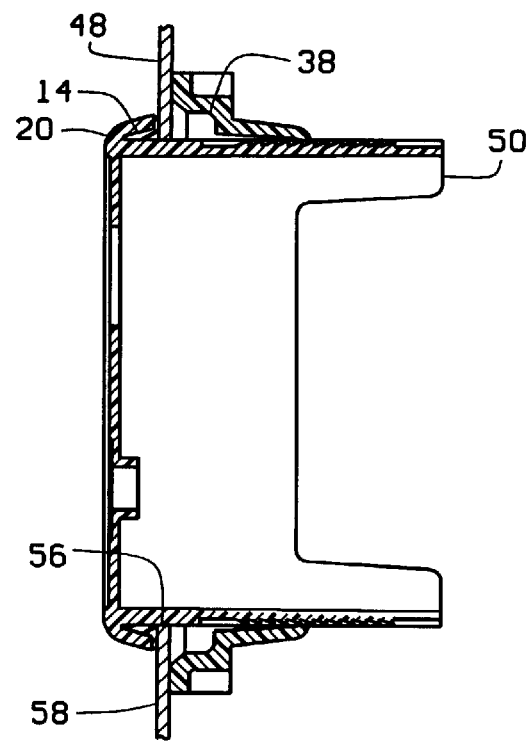
FIG. 2   FIG. 3
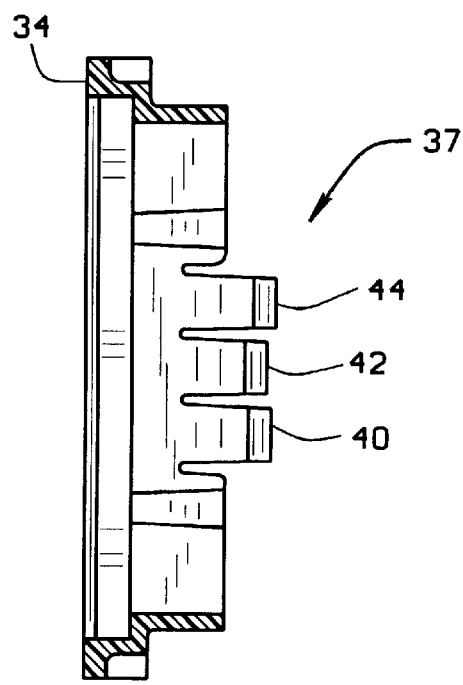
FIG. 4

5,913,439

MOUNTING ASSEMBLY WITH DUAL MOUNT COLLAR

FIELD OF THE INVENTION

This invention relates to mounting assemblies for affixing devices to control panels, and more particularly to a mounting assembly incorporating a collar that allows a device to be either flush mounted or through mounted to a control panel.

BACKGROUND OF THE INVENTION

The mounting of a device, such as an electrical control, onto control panels is conventionally done by containing the device in a flanged housing and rearwardly inserting the housing through an opening in the panel until the flange comes to rest on the front of the panel. A lateral extension, such as a collar or bracket, is then attached to the side of the housing behind the control panel to prevent the device moving forward out of the control panel. Alternatively, where a smooth front surface of the control panel is desired, the device is conventionally affixed to the rear of the control panel, in which case appropriate openings are cut in the panel to access the device from the front of the panel and the device is bolted to the back of the panel in alignment with the openings. In either case, the device should be solidly mounted but easily removable for repair or replacement. These two alternate forms of mounting have conventionally used different housings and fasteners.

Mounting assemblies are also used for mounting electrical outlets and switches into outlet boxes, but since the outlet box is normally rearwardly closed prior to installation of the outlet or switch, these are inapplicable to control panel mounting assemblies, where rear access is available during mounting of the devices.

SUMMARY OF THE INVENTION

It is in view of the above problems that the present invention was developed.

The invention thus has as an object to provide a mounting assembly for a control panel device which allows the device to be selectively mounted either through a panel opening or onto the rear of the of the panel using the same housing.

It is a further object to provide a mounting collar, which rests directly against the rear of the control panel in either mounting mode selected.

It is a further object to provide a mounting assembly with a more precise adjustment of the collar relative to the housing.

The above objects are achieved by the invention, which provides an assembly for mounting a device to a control panel, comprising a housing having a front surface, a sidewall and a flange adjacent said front surface extending laterally beyond said sidewall, the flange having a width and depth; a collar having a flat front face, a longitudinal bore adapted to surround and receive said housing sidewall, a forwardly and inwardly open recess adjacent the passageway of a depth and width closely approximating the depth and width of the flange and adapted to receive the flange within the recess; a ratchet arm on one of and ribs on the other of the housing and collar for preventing rearward movement of the collar relative to the housing while allowing forward movement of the collar on the housing and a plurality of passageways on an outer portion of the collar adapted to receive projections from the rear of the control panel. Additional ratchet arms of different lengths may be added to achieve more precise adjustment of the position of the collar on the housing. The housing and the collar are preferably of molded plastic.

BRIEF DESCRIPTION OF THE DRAWINGS

The advantages of this invention will be better understood by referring to the accompanying drawing, in which

FIG. 2 is a vertical cross-sectional view of the assembly of FIG. 1 mounted on the rear of a control panel taken through the vertical centerline and viewing from the right side (the back of FIG. 1), but showing the ratchet arms and grooves on the top and bottom sidewalls;

FIG. 3 is a vertical cross-sectional view of the assembly of FIG. 1 mounted through a control panel taken through the vertical centerline and viewing from the right side (the back of FIG. 1), but showing the ratchet arms and grooves on the top and bottom sidewalls; and FIG. 4 is a vertical cross-sectional view of the collar of FIG. 1 taken through the vertical centerline and viewing from the right side (the back of FIG. 1).

DESCRIPTION OF THE PREFERRED EMBODIMENTS

Figure 1:
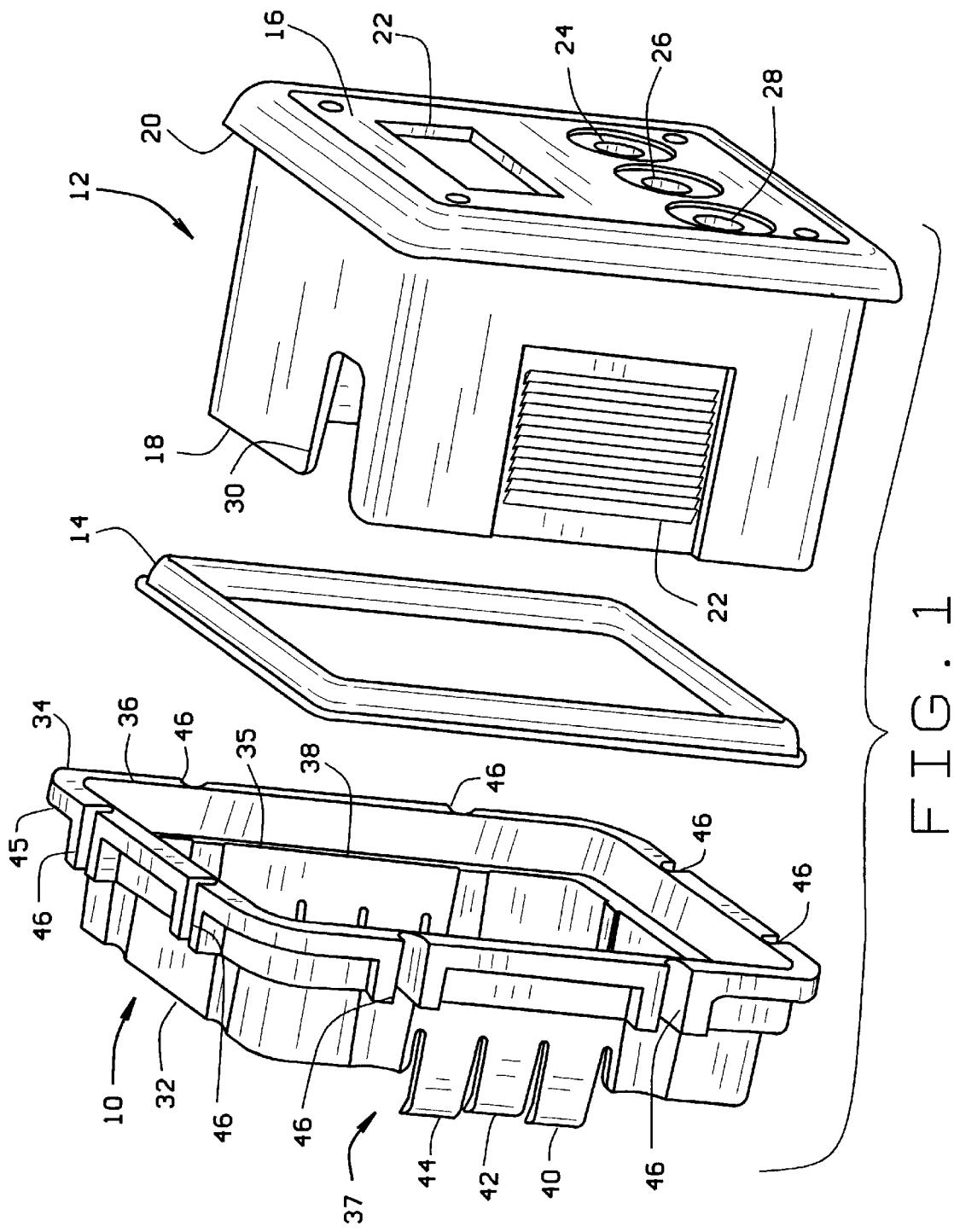
FIG. 1 is a left upper front perspective view of the assembly of the invention shown with parts aligned but unassembled.

The invention will now be described with reference to the preferred embodiment shown in FIGS. 1–4. The invention comprises a collar 10 and a flanged housing 12. The housing serves to contain a control device (not shown.) A gasket 14 may optionally be included.

The housing 12 is shown as a rearwardly open, rectangular molded plastic box with a generally flat front face 16, a tubular rear sidewall 18 and a lateral flange 20. A plurality of longitudinally spaced parallel ribs 22 are provided on sidewall 18. One or more openings 22, 24, 26, 28 may be provided in the face 16 for passage of control information to or from the control device within housing 12 and one or more openings 30 may be provided in sidewall 18 for electrical leads or other wires to the device. The flange may be beveled to provide a smoother front appearance when mounted and is preferably provided with a rearward facing groove 54 (as seen in FIG. 2 and FIG. 3) to receive gasket 14.

The collar 10 as shown has a tubular rectangular molded plastic body 32 with a flat front face 34, a longitudinal bore 35, a forwardly and inwardly open recess 36, two sets 37 of three rearwardly extending ratchet arms 40, 42, 44 of varying length, and an outer portion 45 defining a plurality of passageways 46. The longitudinal bore 35 conforms to the shape of the sidewall 18 of the housing and is adapted to slide over and surround the sidewall to restrain the housing. The recess 36 has a depth and width which closely approximately the depth and width of flange 20, so that with sidewall 18 within bore 35, the collar 10 can slide all the way forward over housing 12 until flange 20 contacts a ledge 38 defining the bottom of recess 36. In this position the front faces of the collar and housing would lie in approximately the same plane. This allows the collar to lie against the rear of a control panel 48 when the housing is mounted on the rear of the control panel as shown in FIG. 2. Without the recess 36, the collar would be prevented by the housing flange from contacting the rear of the panel. The housing flange must be present to prevent the housing from moving rearwardly through the control panel opening when mounted in normal manner through the panel from the front as shown in FIG. 3. Two sets 37 of three ratchet arms 40, 42, 44 extend longitudinally rearwardly from opposite sidewalls of the collar. These ratchet arms are of different lengths, the variances in length being less than the longitudinal spacing between the housing ribs. The ratchet arms sequentially engage each of the ribs 22, with one ratchet arm being engaged at any time. The ratchet arms are preferably placed near the centerline of the sides to minimize tilting of the collar, although in the mounted position the control panel will force the collar to lie parallel to the control panel. The additional ratchet arms allow the collar to be positioned more snugly against the rear of the panel and thus give a firmer mounting of the device onto the panel.

Referring now to FIG. 2, it will be seen that the housing can be mounted behind the control panel to give a smooth front surface to the panel. In this position the collar 10 is placed over the rear 50 of housing 16 and slid forward over sidewall 18 until flange 20 contacts the ledge 38 which forms the bottom of recess 36. The ratchet arms engage the housing ribs 22 to hold the collar onto the housing in this position. The collar and housing unit, thus assembled are then inserted over threaded studs 58 projecting from the rear of the panel, the studs 58 being received in the longitudinal passageways 46 disposed in outer portions of the collar. Finally, nuts 60 are placed on the studs and tightened against the outer portions of collar 10 to hold the collar and housing against the back of the panel. In this position the front face 34 of the collar preferably lies outwardly from and in approximately in the same plane as the front face 16 of the housing. Although the front face 16 is shown slightly behind the forward of flange 20 in FIG. 2, a label (not shown) would normally be attached to the front face 16 and result in a level surface. If, instead of the panel 48 having a single precut opening 52, as shown in FIG. 2, to expose the entire face 16, the housing has openings (not shown) which match the openings 22, 24, 26, 28 in face 16, a label could be placed on the front of the panel, and such might be preferred where the label is desired to be larger than the opening 52. The use of recess 36 in collar 10 permits the flange 20 to be beveled or have any desired shape, since the recess 36 is constructed to match the depth and width of the flange. The gasket 14, which serves to seal the opening 56 for through mounting, would preferably not be used in this rear mount position, as it would have to be received in recess 36 and that would introduce a variable thickness to the amount of material in recess 36 which might cause prevent the collar 10 from lying flush against the rear of the panel.

Referring now to FIG. 3, the through mounting position is shown. To achieve this mounting position a hole conforming to the periphery of the sidewall 18 housing 12 is cut in the control panel. A sealing gasket 14 is positioned in groove 54 on the rear of flange 20 and the housing inserted rearwardly through the opening from the front 58 of the panel. The collar 10 is then slid forwardly over the rear of the housing until the front face 34 of the collar comes to rest against the rear of the control panel and the housing is pulled rearwardly until gasket 14 is sealed against the front surface of the panel. Ratchet arms 40, 42 and 44 slide forwardly over ribs 22 until the front face 34 of collar 10 comes to rest against the rear of the control panel. The ratchet arms engage the ribs to prevent rearward movement of the collar on the housing, thus capturing the panel between the collar 10 and the gasket 14, thus firmly holding the housing in the panel and sealing the panel opening.

Since the position of ratchet sets 37 was shown rotated ninety degrees from their preferred position, FIG. 4 is provided to show their normal position on the collar, as in FIG. 1. The length of the ratchet arms could be longer or shorter depending on the length of housing 12 and the longitudinal position of the ribs.

Having described the mounting assembly of the invention structurally, the manufacture of the device will be briefly described. The collar 10 and housing 12 may be molded of plastic by any suitable conventional technique. The gasket 14 would be molded of suitable resilient material. In suitable volumes, the mounting assembly can thus be made relatively inexpensively. It will be appreciated that other materials or combinations thereof may be used to achieve similar results. While it is preferred to have the ratchet 40, 42, 47 on the collar 10 and the grooves 22 on the housing 12, their positions could be reversed. The collar 10 is shown as being flanged to minimize the length of the studs 58 needed for rear mounting, but could have a straight outside surface if desired. Although plastic parts are preferable, metallic housings and collars could be utilized if desired. While the device is shown as rectangular, an oval or circular or any desired overall external shape could be utilized. While the collar 10 preferably conforms to the shape of the housing 12, it need only sufficiently conform to allow the housing flange 20 to be received in the collar recess 36 and to allow the ratchet arm 40, 42, 47 to engage the ribs 22 and to prevent the housing 12 from moving within the collar 10 once mounted in the desired position on a control panel 48. While threaded studs 58 and nuts 60 are shown holding the collar 10 in the rear mount position in FIG. 2, other fasteners could be used, with the passageways 46 being modified as necessary. The simplicity of the invention allows such modifications within the scope of the invention.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

All patents, if any, referenced herein are incorporated in their entirety for purposes of background information and additional enablement.

What is claimed is:

1. An assembly for mounting a device on a control panel in a selectable configuration, comprising:

a housing having a front surface, a sidewall and a flange adjacent said front surface extending laterally beyond said sidewall, said flange having a width and depth;

a collar having a flat front face, a longitudinal bore adapted to surround and receive said housing sidewall, a forwardly and inwardly open recess adjacent said passageway, said recess having a depth and width closely approximating the depth and width of said flange and adapted to receive said flange therein;

a ratchet arm longitudinally extending from said collar;

a plurality of ribs longitudinally spaced on said housing sidewall and adapted to receive said ratchet arm;

a plurality of longitudinal passageways disposed about an outer portion of said collar, said passageways adapted to receive protrusions from the control panel when in a configuration wherein said front surface of said housing is flush with the control panel; and wherein said collar is adapted to receive the control panel between said collar and said flange when in a configuration wherein said front surface of said housing forwardly extends from the control panel.

2. The assembly of claim 1, further comprising a groove disposed within said flange and removable gasket disposed within said groove when in a configuration wherein said front surface of said housing forwardly extends from the control panel.

3. The assembly of claim 1, wherein said collar and said housing are of molded plastic.

4. The assembly of claim 1, wherein said housing has a closed front surface.

5. The assembly of claim 4, wherein said front surface has at least one data transfer device thereon for the input and output of control information to and from said transfer device.

6. The assembly of claim 1, wherein the flange is beveled.

7. The assembly of claim 1, further comprising a plurality of transversally spaced ratchet arms longitudinally extending from said collar.

8. The assembly of claim 7, wherein said ratchet arms are of varied lengths, the variances in lengths of said ratchet arms being different than the spacing of said ribs so as to cause said ratchet arms to sequentially engage said ribs.

9. The assembly of claim 8, wherein said ribs are located on said housing and said ratchet arms are located on said collar.

10. The assembly of claim 8, wherein there are at least two identical sets of said ratchet arms, one set being disposed on each of two opposite sides of said collar, and at least two sets of said ribs, one set being disposed on each of two opposite sides of said housing.

11. The assembly of claim 10, wherein there are at least three ratchet arms in each set of ratchet arms.

12. The assembly of claim 11, having an equal number of sets of said ribs and sets of said ratchet arms.

13. The assembly of claim 8, wherein said ratchet arms are disposed parallel to and in close proximity to one, said ratchet arms lying in the same plane.

14. A collar for mounting a flanged housing on a control panel in a selectable configuration, comprising:

a flat front face, a bore adapted to surround a slidably receive a rear portion of the housing, a forwardly and inwardly open recess of a depth and width being sized to closely approximate the depth and width of the housing flange, said recess disposed adjacent said bore and adapted to receive the flange therein;

a ratchet arm extending from said front face and adapted to engage a plurality of ribs on the housing;

a plurality of longitudinal passageways disposed about an outer portion of said collar and adapted to receive fasteners attached to the control panel when in a configuration wherein a front surface of the housing is flush with the control panel; and wherein said collar is adapted to received a rear portion of the housing with the control panel between said front face and the housing flange when in a configuration wherein a front surface of the housing forwardly extends from the control panel.

15. The assembly of claim 14, wherein said collar is made entirely of molded plastic.

\* \* \* \* \*